US011245988B2

(12) United States Patent
Ge

(10) Patent No.: US 11,245,988 B2
(45) Date of Patent: Feb. 8, 2022

(54) MOBILE TERMINAL

(71) Applicant: AAC Technologies Pte. Ltd., Singapore (SG)

(72) Inventor: Huan Ge, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 41 days.

(21) Appl. No.: 16/987,383

(22) Filed: Aug. 6, 2020

(65) Prior Publication Data
US 2021/0044904 A1 Feb. 11, 2021

(30) Foreign Application Priority Data
Aug. 9, 2019 (CN) .......................... 201921295887.6

(51) Int. Cl.
*H04R 17/00* (2006.01)
*G06F 1/16* (2006.01)
*H04M 1/02* (2006.01)
*H04M 1/03* (2006.01)

(52) U.S. Cl.
CPC .......... *H04R 17/00* (2013.01); *G06F 1/1652* (2013.01); *H04M 1/0268* (2013.01); *H04M 1/035* (2013.01); *H04R 2400/03* (2013.01); *H04R 2499/11* (2013.01)

(58) Field of Classification Search
CPC ...... H04R 17/00; H04R 7/10; H04R 2400/03; H04R 2499/11; H04R 2440/05; H04M 1/0268; H04M 1/035; G06F 1/1652
See application file for complete search history.

(56) References Cited

U.S. PATENT DOCUMENTS

| 2005/0023937 | A1* | 2/2005 | Sashida | B06B 1/0611 310/348 |
| 2007/0223744 | A1* | 9/2007 | Wada | H04R 23/008 381/152 |
| 2013/0156233 | A1* | 6/2013 | Joo | H04M 1/03 381/151 |
| 2015/0153829 | A1* | 6/2015 | Shiraishi | G06F 1/1626 345/173 |
| 2020/0267248 | A1* | 8/2020 | Park | H04R 7/045 |
| 2021/0233438 | A1* | 7/2021 | Mao | G09F 9/301 |

* cited by examiner

*Primary Examiner* — Tuan D Nguyen
(74) *Attorney, Agent, or Firm* — W&G Law Group

(57) ABSTRACT

The present application discloses a mobile terminal, which comprises a flexible screen, a middle frame matched with the flexible screen to form an accommodation space, an exciter fixed on the middle frame, a support layer clamped between the flexible screen and the middle frame, and a steel sheet at least covering a sound generation area, wherein an area, in which the support layer is not arranged, on the flexible screen forms the sound generation area; and the exciter is fixed on the steel sheet to drive the sound generation area to generate sound through vibration. The sound generation area of the flexible screen is driven by the exciter to generate the sound, so that the mobile terminal provided by the present invention has a better sound generation effect compared with the related art.

10 Claims, 6 Drawing Sheets

MOBILE TERMINAL

FIELD OF THE PRESENT DISCLOSURE

The present application relates to the field of electro-acoustic conversion, in particular to a mobile terminal.

DESCRIPTION OF RELATED ART

A screen sounding technology is that a "piezoelectric actuator technology" is applied to a mobile terminal to perfectly combine a receiver function with an In-Plane Switching (IPS) high-definition screen, and a sounding hole does not need to be arranged in the front side of the mobile terminal. When a piezoelectric actuator is electrified to work, the screen vibrates correspondingly, so as to push the air to generate sound.

In the related art, the screen of the mobile terminal comprises a flexible organic light-emitting diode (OLED) inner screen and a glass protective cover plate. This arrangement can effectively protect the flexible OLED inner screen. However, due to the arrangement of the glass protective cover plate, when the screen sounding technology is applied to the mobile terminal, vibration of the flexible OLED inner screen is limited, a vibration response of the flexible OLED inner screen is relatively low and the acoustic performance is relatively poor.

Therefore, it is necessary to provide a novel mobile terminal to solve the problems mentioned above.

SUMMARY OF THE INVENTION

One of the main objects of the present invention is to provide a mobile terminal with better sound performance.

The present invention accordingly provides a mobile terminal, comprising: a flexible screen; a middle frame matched with the flexible screen for forming an accommodation space; an exciter fixed on the middle frame; a support layer clamped between the flexible screen and the middle frame; and a steel sheet at least covering a sound generation area. Wherein an area, in which the support layer is not arranged, on the flexible screen forms the sound generation area; and the exciter is fixed on the steel sheet for driving the sound generation area to generate a sound through vibration.

In addition, the steel sheet comprises a main body part and a clamping part around the main body part; and the clamping part is clamped between the flexible screen and the support layer.

In addition, the exciter comprises a first part fixed on the middle frame, a second part arranged opposite to the first part, and elastic elements connecting the first part and the second part; the second part is fixedly connected with the main body part for driving the sound generation area.

In addition, the first part comprises a flat board part and an extension part extending from two opposite ends of the flat board part to the direction far away from the flat board part; a penetration hole is formed in the extension part; the exciter further comprises a connector; and the connector passes through the penetration hole to fix the first part on the middle frame.

In addition, the first part is a magnet and the second part is an electromagnet.

In addition, the stiffness of the elastic elements is greater than 5,000 N/m.

In addition, a width of a gap between the first part and the second part is smaller than or equal to 0.6 mm.

In addition, the middle frame comprises a carrier board arranged opposite to the flexible screen, a side wall arranged around the edge of the carrier board, and an annular flange extending inwards from the side wall; and the flange is matched with the side wall to form an accommodation groove for accommodating the flexible screen.

In addition, a first through hole and two mounting holes adjacent to the first through hole are formed in the position of the carrier board corresponding to the sound generation area; the two mounting holes are symmetrically arranged in two opposite sides of the first through hole; and the connector is correspondingly fixed into the mounting holes.

In addition, the support layer is a foam and comprises an upper surface close to the flexible screen and a lower surface arranged opposite to the upper surface; the upper surface is recessed towards the lower surface to form a mounting groove; and the lower surface is recessed towards the upper surface to form a second through hole communicating with the mounting groove; the steel sheet is correspondingly accommodated into the mounting groove.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
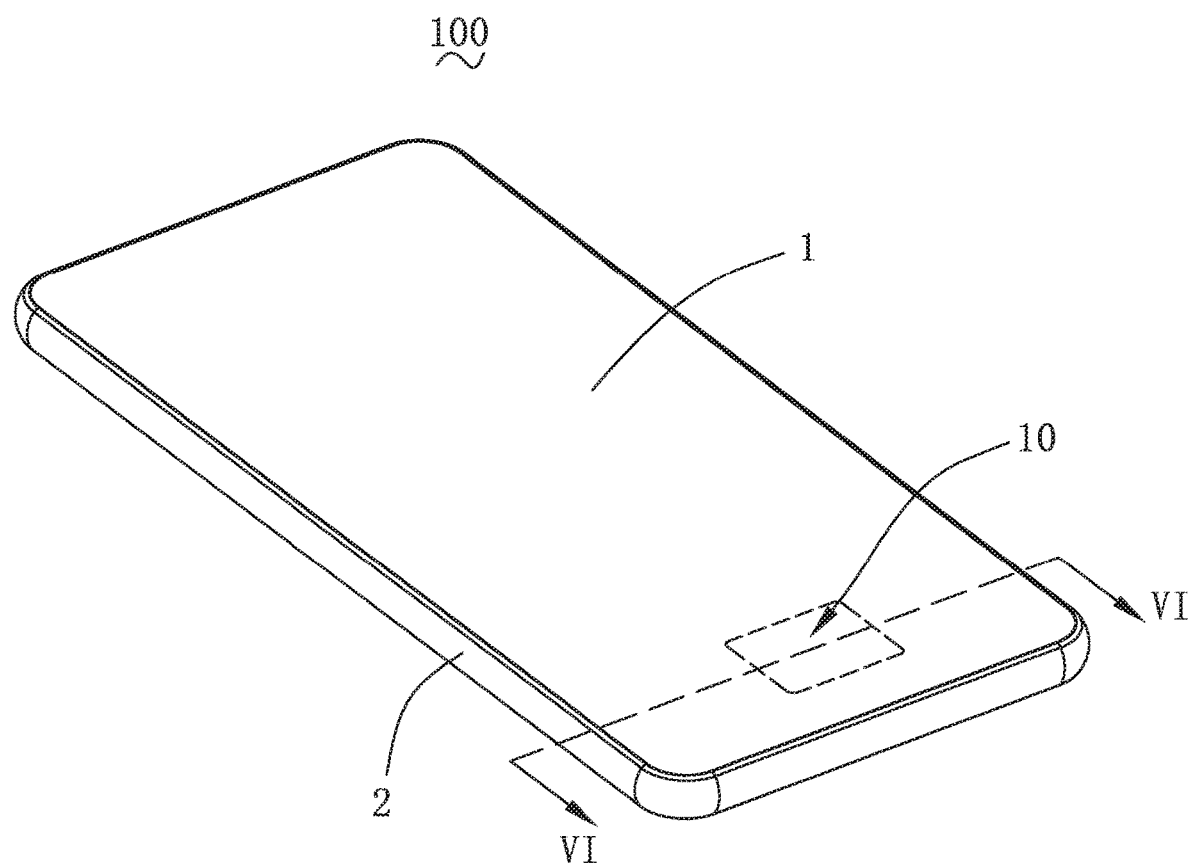
FIG. 1 is an isometric view of a mobile terminal provided by an embodiment of the present application.
Figure 2:
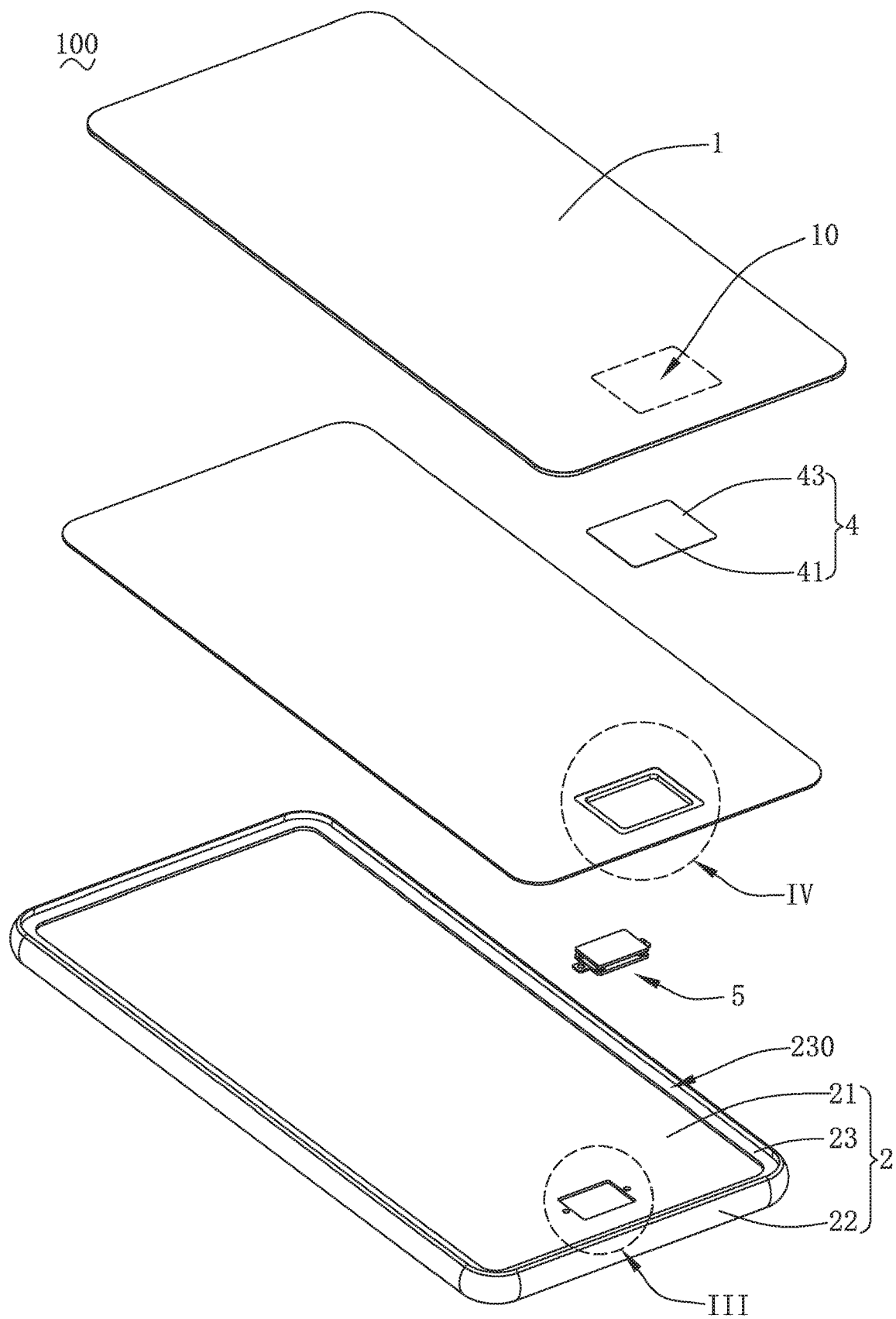
FIG. 2 is an exploded view of the mobile terminal in FIG. 1.
Figure 3:
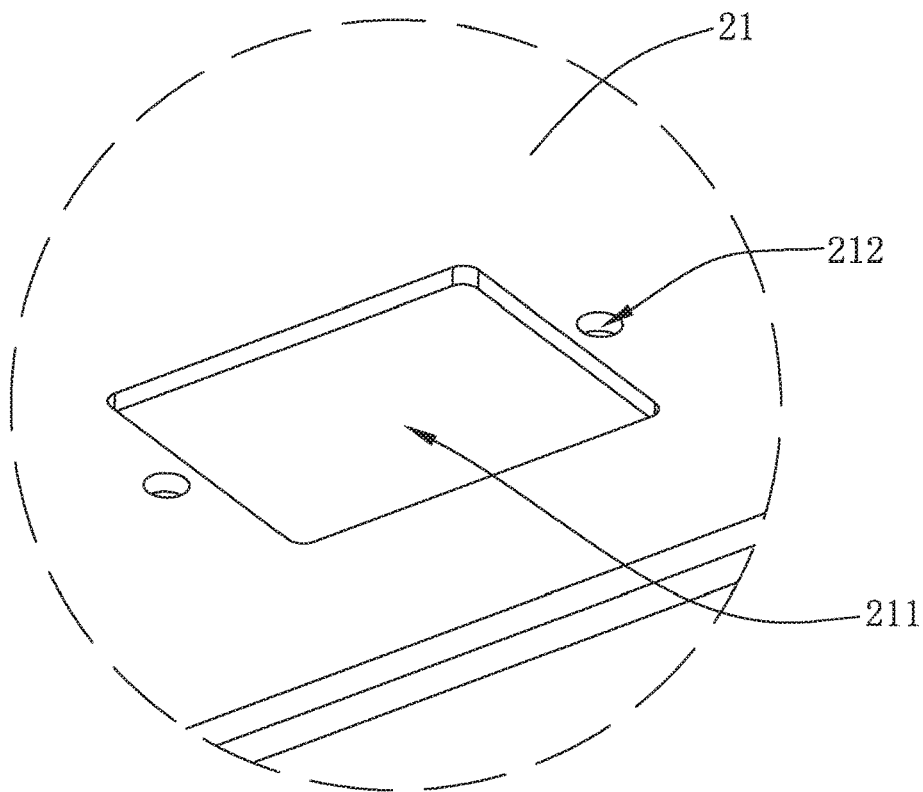
FIG. 3 is an enlarged view of Part III in FIG. 2.
Figure 4:
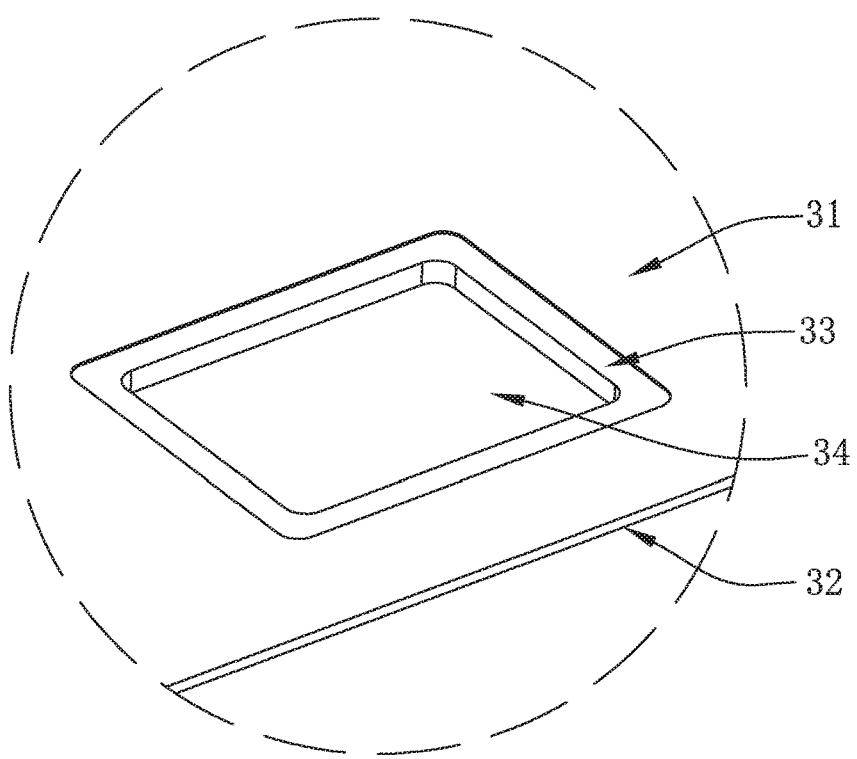
FIG. 4 is an enlarged view of Part IV in FIG. 2.
Figure 5:
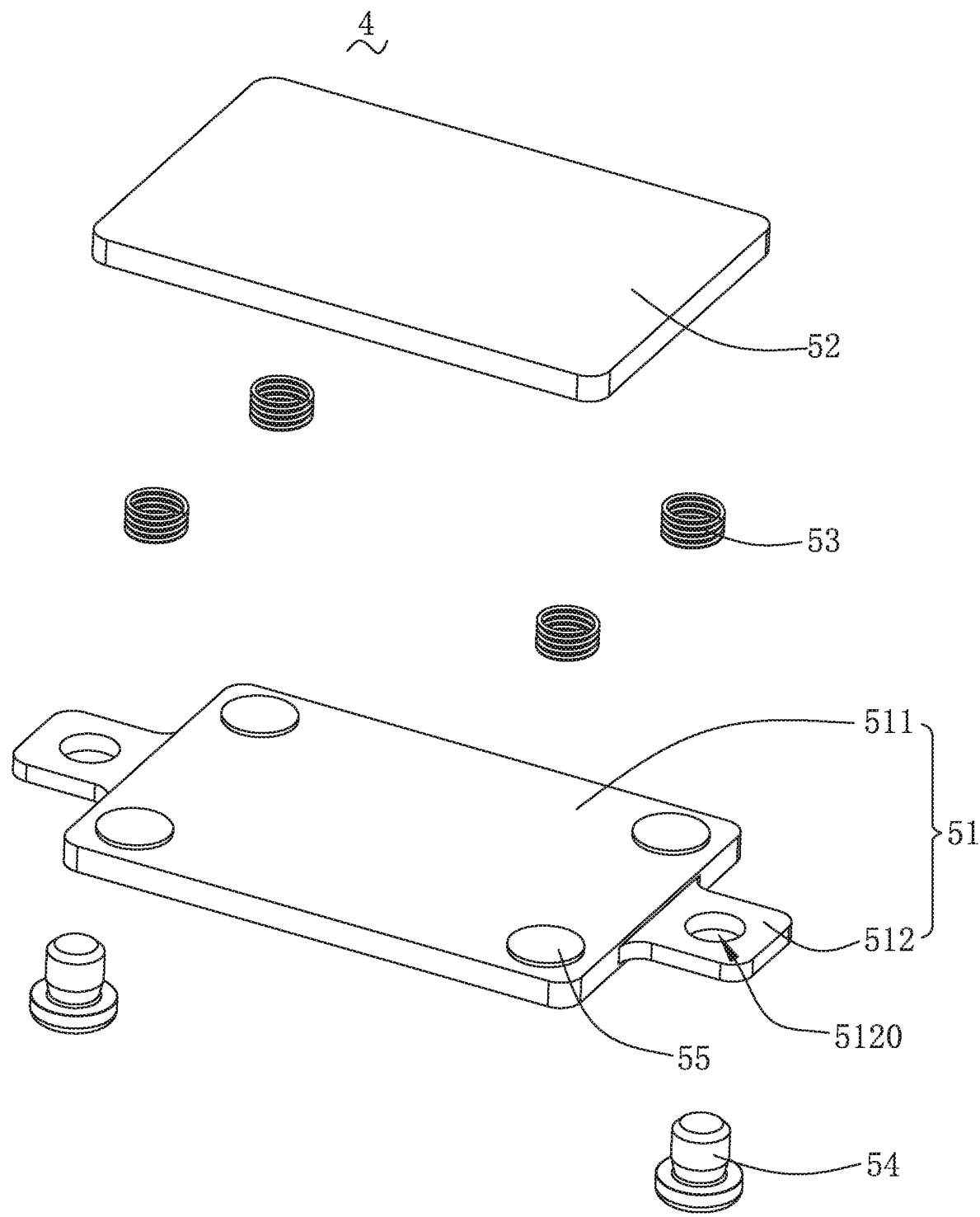
FIG. 5 is an exploded view of an exciter in FIG. 2.
Figure 6:
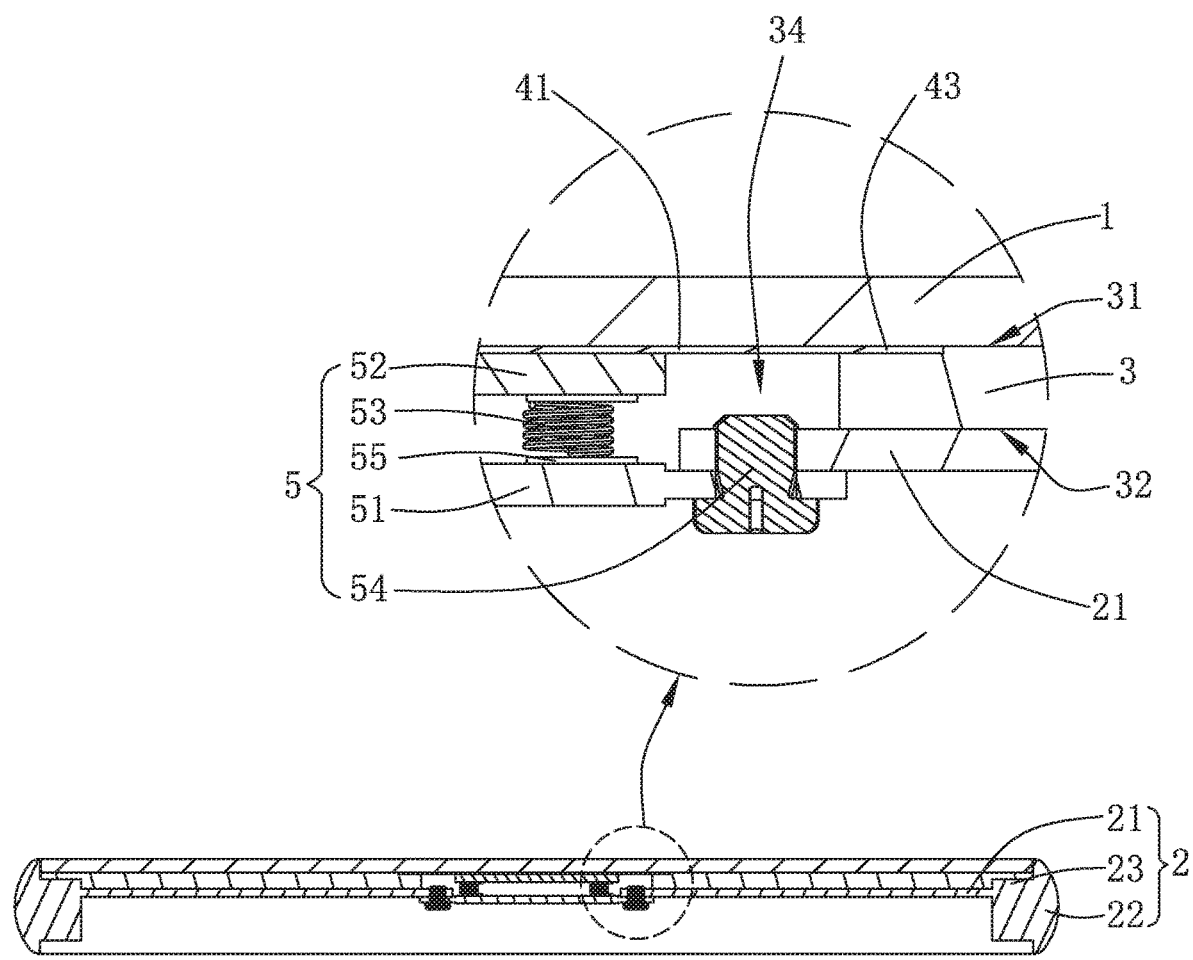
FIG. 6 is a cross-sectional view of the mobile terminal taken along line VI-VI in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Referring to FIGS. 1 to 6, the present application discloses a mobile terminal 100. The mobile terminal 100 comprises a flexible screen 1, a middle frame 2 matched with the flexible screen 1 to form an accommodation space, a support layer 3 clamped between the flexible screen 1 and the middle frame 2, a steel sheet 4 and an exciter 5 fixed on the steel sheet 4.

The flexible screen 1 is made of a plastic substrate; by virtue of a thin film encapsulation technology, a protective film is stuck on one surface of the flexible screen 1 close to the internal space of the mobile terminal 100, so that the flexible screen 1 becomes bendable and is not easy to break and variable in shape, and the use experience is accordingly improved.

An area, in which the support layer 3 is not arranged, on the flexible screen 1 forms a sound generation area 10; and the exciter 5 drives the sound generation area 10 to generate a sound through vibration. It should be noted that the area, besides the sound generation area 10, on the flexible screen 1 can vibrate, but cannot generate the sound because the vibration amount thereof is smaller than that of the sound generation area 10, which is not considered in the present application. Meanwhile, in this embodiment mode, the sound generation area 10 is in a square shape. In other embodiment modes, the sound generation area 10 can also be in a round shape, a triangle shape, a diamond shape or other irregular shapes, which is not limited in the present application.

The middle frame 2 is used for fixedly installing the flexible screen 1. Specifically, the middle frame 2 comprises a carrier board 21 arranged opposite to the flexible screen 1, a side wall 22 arranged around the edge of the carrier board 21, and an annular flange 23 extending inwards from the side wall 22. The flange 23 is matched with the side wall 22 to form an accommodation groove 230 for accommodating the flexible screen 1. The flexible screen 1 is correspondingly accommodated into the accommodation groove 230; and furthermore, the flexible screen 1 is fixed to the flange 23 in a gluing manner, thereby achieving fixed installation of the flexible screen 1.

A first through hole 211 and mounting holes 212 adjacent to the first through hole 211 are formed in the position of the carrier board 21 corresponding to the sound generation area 10. Two mounting holes 212 are arranged. The two mounting holes 212 are symmetrically arranged in two opposite sides of the first through hole 211.

The support layer 3 is clamped between the flexible screen 1 and the middle frame 2, for supporting the flexible screen 1, and for effectively buffering external force on the flexible screen 1, so as to prolong the service life of the flexible screen 1. Preferably, the support layer 3 is foam. The support layer 3 comprises an upper surface 31 close to the flexible screen 1 and a lower surface 32 arranged opposite to the upper surface 31. The upper surface 31 is recessed towards the lower surface 32 to form a mounting groove 33. And the lower surface 32 is recessed towards the upper surface 31 to form a second through hole 34 communicating with the mounting groove 33. The second through hole 34 communicates with the first through hole 211. The opening area of the second through hole 34 is greater than that of the first through hole 211.

The steel sheet 4 is accommodated into the mounting groove 33 and at least covers an occurrence area 10. The steel sheet 4 comprises a main body part 41 arranged corresponding to the occurrence area 10, and a clamping part 43 clamped between the flexible screen 1 and the support layer 3. The clamping part 43 is arranged around the main body part 41.

The steel sheet 4 can be attached to the inner surface of the sound generation area 10 in a gluing manner, for supporting the flexible screen 1, and simultaneously plays a certain fixing role in the flexible screen 1. Preferably, the main body part 41 completely covers the sound generation area 10, so that a better support effect can be ensured.

The exciter 5 is used for driving the flexible screen 1 to generate the sound through vibration. Specifically, the exciter 5 comprises a first part 51 fixed on the middle frame 2, a second part 52 arranged apart from the first part 51, and elastic elements 53 connecting the first part 51 and the second part 52. The second part 52 is correspondingly fixed on the steel sheet 4 to drive the occurrence area 10 to generate the sound through vibration. Specifically, the first part 51 is a magnet, the second part 52 is an electromagnet, and attracting or repelling or magnetic force exists between the first part 51 and the second part 52. In a static condition, the magnitude of the magnetic force between the first part 51 and the second part 52 is just balanced with that of the elastic force of the elastic elements 53. The exciter 5 is enabled to be matched with the interval between the flexible screen 1 and the middle frame 2 by adjusting the overall height thereof, so as to ensure that the flexible screen 1 is in a flat state.

The first part 51 comprises a flat board part 511 and an extension part 512 extending from two opposite ends of the flat board part 511 to the direction far away from the flat board part 511. A penetration hole 5120 is formed in the extension part 512. The exciter 5 further comprises a connector 54, and the connector 54 passes through the penetration hole 5120 to fix the first part 51 on the carrier board 21. Specifically, the size of the connector 54 is matched with those of the mounting holes 212, and the connector 54 are correspondingly connected with the mounting holes 212. Preferably, the connector 54 is a bolt, which is provided with an external screw, and each mounting hole 212 is provided with an internal screw matched therewith. It should be noted that, in the present application, a connection mode of the extension part 512 and the carrier board 21 is not limited to threaded connection only. In other embodiment, the extension part 512 and the carrier board 21 can be fixed in a gluing manner or other manners.

Furthermore, the projection of the second part 52 toward the first part 51 completely coincides with the flat board part 511. The steel sheet 4 is clamped between the flexible screen 1 and the second part 52. The flexible screen 1, the steel sheet 4 and the second part 52 are fixedly connected in sequence, so that better movement consistency can be kept and a movement state of the second part 52 can be effectively conducted to the flexible screen 1.

The elastic elements 53 are clamped between the first part 51 and the second part 52 and are used for elastically supporting the second part 52. Four elastic elements 53 are arranged, and the four elastic elements 53 are symmetrically arranged two by two at the corner of the first part 51 or the second part 52. Furthermore, gaskets 55 are also arranged at the positions, corresponding to the elastic elements 53, of the first part 51 and the second part 52; the gaskets 55 are used for fixedly installing the elastic elements 53, so as to improve the stability of the elastic elements 53. Preferably, the elastic elements 53 are springs; and the stiffness of the elastic elements 53 is greater than 5,000 N/m.

After installation of the exciter 5 is completed, the first part 51 is correspondingly fixed at the lower part of the carrier board 21, and the elastic elements 53 pass through the first through hole 211 to support the second part 52. It will be understood that the first part 51 and the second part 52 are separately arranged at two opposite sides of the carrier board 21 in the static condition. After the exciter 5 adds an excitation signal, the second part 52 correspondingly vibrates and the elastic elements 53 are used for achieving return of the second part 52, and meanwhile, the vibration amount of the second part 52 can be increased, thereby improving the acoustic performance. Furthermore, the size of the first through hole 211 is greater than that of the second part 52, so that the first through hole 211 can become a part of the travel of the second part 52 and the vibration amount of the second part 52 is increased. Furthermore, the interval between the first part 51 and the second part 52 is smaller than or equal to 0.6 mm, so that larger driving force on the flexible screen 1 within the sound generation area 10 can be ensured. The second part 52 can provide a hard supply function when the sound generation area 10 greatly deforms, so as to avoid an obvious display problem or mechanical damage to the flexible screen 1. Meanwhile, due to the arrangement of the steel sheet 4, the contact area of the second part 52 and the flexible screen 1 is increased, damage caused by excessive vibration of a local position within the sound generation area 10 can be avoided, and the service life of the flexible screen 1 is further prolonged.

Figure 7:
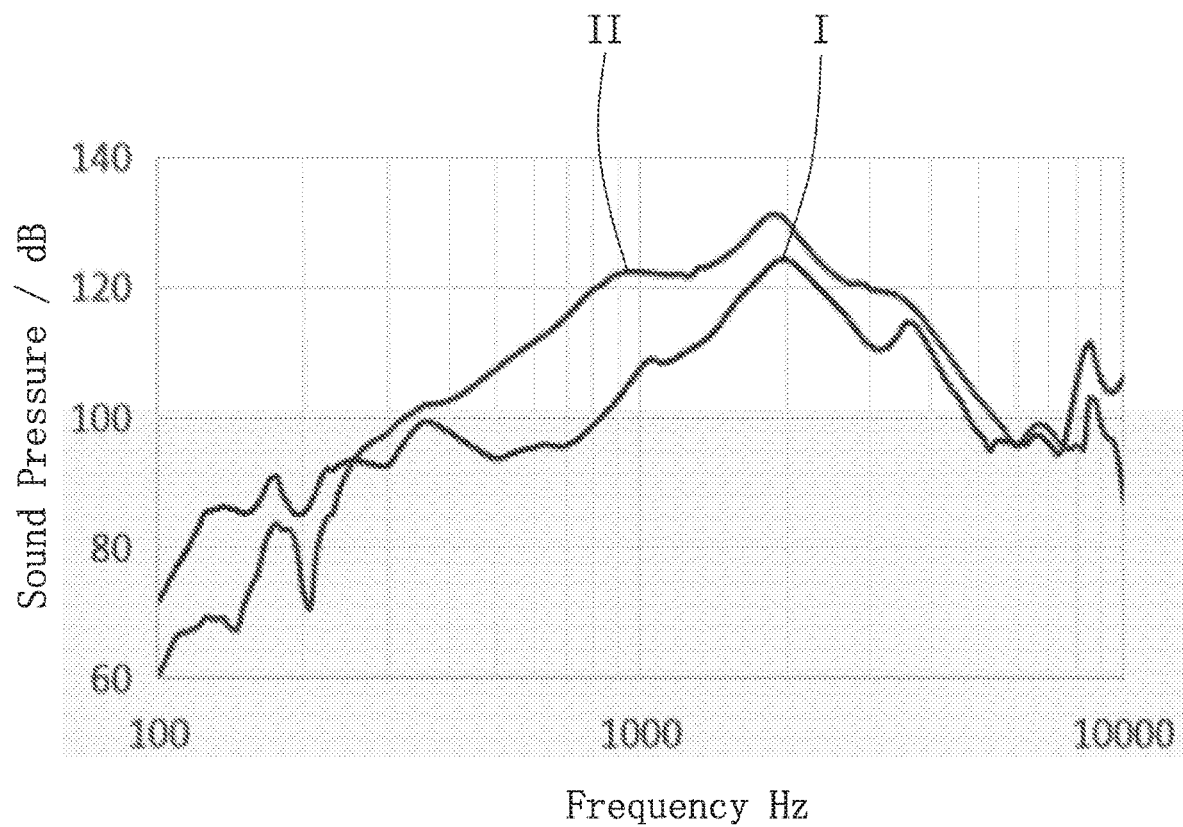
FIG. 7 shows a comparison of response between the screens in the mobile terminal disclosed by the present application and the mobile terminal in the related art.

Referring to FIG. 7, a curve I is a response curve of the screen of the mobile terminal in the related art in sound generation; and a curve II is the response curve of the screen of the mobile terminal disclosed by the present application in sound generation. The FIG. 7 shows that a response of the screen of the mobile terminal disclosed by the present application in sound generation is better, so that the mobile terminal disclosed by the present application has good acoustic performance.

It should be noted that the "flexible screen" in the present application is not limited to the "screen" only at the vibration part in the mobile terminal 100, and a back cover, the middle frame, a panel and the like can also be arranged at the vibration part, which is not limited in the present application.

Compared with the related art, in the mobile terminal provided by the present application, the exciter is fixed on the middle frame, and the sound generation area of the flexible screen is driven by the exciter to generate a sound through vibration, so that a vibration response of the flexible screen is improved, the acoustic performance is improved. Meanwhile, the mobile terminal has the advantages of high loudness, high efficiency, high sound quality and the like. Meanwhile, the sound generation area of the flexible screen is supported by adopting the steel sheet, so that better flatness of the flexible screen can be ensured. The contact area of the exciter and the flexible screen is increased, while damage caused by excessive local vibration in the sound generation area of the flexible screen is avoided and the service life of the flexible screen is prolonged.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A mobile terminal, comprising:
a flexible screen;
a middle frame matched with the flexible screen for forming an accommodation space;
an exciter fixed on the middle frame;
a support layer clamped between the flexible screen and the middle frame;
and a steel sheet at least covering a sound generation area; wherein
an area, in which the support layer is not arranged, on the flexible screen forms the sound generation area; and the exciter is fixed on the steel sheet for driving the sound generation area to generate a sound through vibration.

2. The mobile terminal as described in claim 1, wherein the steel sheet comprises a main body part and a clamping part around the main body part; and the clamping part is clamped between the flexible screen and the support layer.

3. The mobile terminal as described in claim 2, wherein the exciter comprises a first part fixed on the middle frame, a second part arranged opposite to the first part, and elastic elements connecting the first part and the second part; the second part is fixedly connected with the main body part for driving the sound generation area.

4. The mobile terminal as described in claim 3, wherein the first part comprises a flat board part and an extension part extending from two opposite ends of the flat board part to the direction far away from the flat board part; a penetration hole is formed in the extension part; the exciter further comprises a connector; and the connector passes through the penetration hole to fix the first part on the middle frame.

5. The mobile terminal as described in claim 4, wherein the first part is a magnet and the second part is an electromagnet.

6. The mobile terminal as described in claim 4, wherein the stiffness of the elastic elements is greater than 5,000 N/m.

7. The mobile terminal as described in claim 4, wherein a width of a gap between the first part and the second part is smaller than or equal to 0.6 mm.

8. The mobile terminal as described in claim 4, wherein the middle frame comprises a carrier board arranged opposite to the flexible screen, a side wall arranged around the edge of the carrier board, and an annular flange extending inwards from the side wall; and the flange is matched with the side wall to form an accommodation groove for accommodating the flexible screen.

9. The mobile terminal as described in claim 4, wherein a first through hole and two mounting holes adjacent to the first through hole are formed in the position of the carrier board corresponding to the sound generation area; the two mounting holes are symmetrically arranged in two opposite sides of the first through hole; and the connector is correspondingly fixed into the mounting holes.

10. The mobile terminal as described in claim 2, wherein the support layer is a foam and comprises an upper surface close to the flexible screen and a lower surface arranged opposite to the upper surface; the upper surface is recessed towards the lower surface to form a mounting groove; and the lower surface is recessed towards the upper surface to form a second through hole communicating with the mounting groove; the steel sheet is correspondingly accommodated into the mounting groove.

* * * * *